(12) United States Patent
Pala

(10) Patent No.: US 11,552,806 B2
(45) Date of Patent: Jan. 10, 2023

(54) SYSTEMS AND METHODS FOR ENHANCED PUBLIC KEY INFRASTRUCTURE

(71) Applicant: CABLE TELEVISION LABORATORIES, INC, Louisville, CO (US)

(72) Inventor: Massimiliano Pala, Denver, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 412 days.

(21) Appl. No.: 16/537,380

(22) Filed: Aug. 9, 2019

(65) Prior Publication Data

US 2021/0006417 A1 Jan. 7, 2021

Related U.S. Application Data

(60) Provisional application No. 62/713,165, filed on Aug. 1, 2018, provisional application No. 62/869,953, filed on Jul. 2, 2019.

(51) Int. Cl.
*H04L 9/32* (2006.01)
*H04L 9/14* (2006.01)

(52) U.S. Cl.
CPC .............. *H04L 9/3268* (2013.01); *H04L 9/14* (2013.01); *H04L 9/3247* (2013.01)

(58) Field of Classification Search
None
See application file for complete search history.

(56) References Cited

U.S. PATENT DOCUMENTS

| 6,931,537 | B1* | 8/2005 | Takura | H04L 9/3297 |
| | | | | 713/180 |
| 2014/0014715 | A1* | 1/2014 | Moran | G06K 19/06084 |
| | | | | 235/375 |
| 2018/0097640 | A1* | 4/2018 | Queralt | G06F 21/41 |
| 2018/0262504 | A1* | 9/2018 | Frederick | H04L 9/006 |
| 2019/0020641 | A1* | 1/2019 | Wasily | H04L 9/3213 |
| 2019/0036688 | A1* | 1/2019 | Wasily | G16H 80/00 |

OTHER PUBLICATIONS

Fatima et al., X.509 and PGP Public Key Infrastructure methods: A Critical Review, 2015, IFCSNS International Journal of Computer Science and Network Security vol. 15 No. 5: pp. 55-59 (Year: 2015).*

(Continued)

*Primary Examiner* — Luu T Pham
*Assistant Examiner* — Edward X Long
(74) *Attorney, Agent, or Firm* — Armstrong Teasdale LLP

(57) ABSTRACT

A system for enhanced public key infrastructure is provided. The system includes a computer device. The computer device is programmed to receive a digital certificate including a composite signature field including a plurality of signatures. The plurality of signatures include at least a first signature and a second signature. The computer device is also programmed to retrieve, from the digital certificate, a first key associated with the first signature from the digital certificate. The computer device is further programmed to retrieve the first signature from the composite signature field. In addition, the at least one computer device is programmed to validate the first signature using the first key.

14 Claims, 2 Drawing Sheets

(56) References Cited

OTHER PUBLICATIONS

Sun, Y., Zhang, R., Wang, X., Gao, K. and Liu, L., Jul. 2018. A decentralizing attribute-based signature for healthcare blockchain. In 2018 27th International conference on computer communication and networks (ICCCN) (pp. 1-9). IEEE. (Year: 2018).*

Harn, L. and Ren, J., 2011. Generalized digital certificate for user authentication and key establishment for secure communications. IEEE Transactions on Wireless Communications, 10(7), pp. 2372-2379. (Year: 2011).*

* cited by examiner

SYSTEMS AND METHODS FOR ENHANCED PUBLIC KEY INFRASTRUCTURE

CROSS REFERENCE TO RELATED APPLICATIONS

This application claims the benefit of and priority to U.S. Provisional Patent Application No. 62/713,165, filed Aug. 1, 2018, entitled "COMPOSITE KEYS AND SIGNATURES FOR DATA AUTHENTICATION," and to U.S. Provisional Patent Application No. 62/869,953, filed Jul. 2, 2019, entitled "COMPOSITE KEYS AND SIGNATURES FOR DATA AUTHENTICATION," the entire disclosures of which are incorporated by reference in their entireties.

BACKGROUND

The field of the disclosure relates generally to public key infrastructures (PKIs), and more particularly, to systems and methods for providing PKIs having enhanced support for multiple keys and multiple encryption methods.

Many conventional electronic devices utilize digital certificates, such as X.509 certificates to establish trust between devices. The digital certificates are tied to the identity of a person or legal entity, typically through a trusted Certificate Authority (CA). Overtime the digital certificates may need to be revoked for a variety of reasons, including the encryption keys associated with the certificate have been compromised.

One of the major security features of the digital certificates is the security of the public and private key associated with the certificate. Since the security of PKIs depends on the security of the cryptographic building blocks that are used for authentication and encryption, the standard communication has made algorithm agility one of the main goals to provide the possibility to use different algorithm and potentially upgrade to newly available algorithms when needed.

However, present key systems do not account for the definition of new algorithms (e.g. more efficient factoring techniques) and technologies (e.g., quantum-based computing devices) that may be available in the near future. Accordingly, there is a need for easy-to-deploy and efficient solutions to provide support for multi-algorithm authentication.

SUMMARY

In an embodiment, a system for enhanced public key infrastructure is provided. The system includes a computer device including at least one processor in communication with at least one memory device. The at least one memory device stores a plurality of instructions. The at least one processor is programmed to receive a digital certificate including a composite signature field including a plurality of signatures. The plurality of signatures include at least a first signature and a second signature. The at least one processor is also programmed to retrieve, from the digital certificate, a first key associated with the first signature from the digital certificate. The at least one processor is further programmed to retrieve the first signature from the composite signature field. In addition, the at least one processor is programmed to validate the first signature using the first key.

In another embodiment, a computing device for enhanced public key infrastructure is provided. The computing device includes at least one processor in communication with at least one memory device. The at least one memory device stores a plurality of instructions. The at least one processor is programmed to generate a first signature using a first key and a first cryptographic algorithm. The at least one processor is also programmed to generate a second signature using a second key and a second cryptographic algorithm. The at least one processor is further programmed to combine the first signature and the second signature into a composite signature. In addition, the at least one processor is programmed to generate a digital certificate including the composite signature in a single field.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
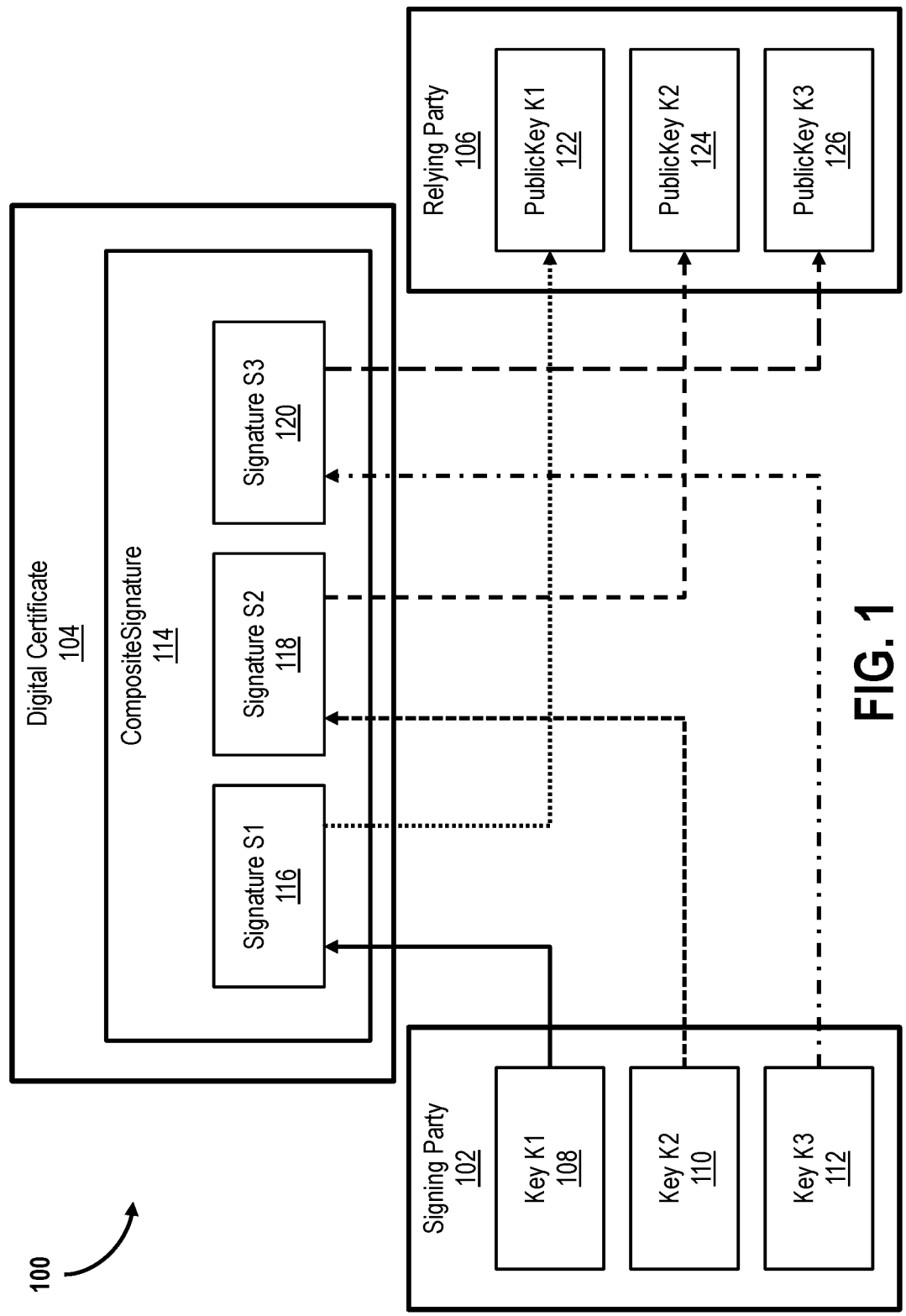
FIG. 1 is a schematic illustration of a composite signature process and data structures used with the composite signature process, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The embodiments described herein provide systems and methods for enhanced public key infrastructure (PM) supporting multiple keys and multiple encryption methods. More specifically, the systems and methods described herein provide for composite keys and composite signatures that allow enable certificates to advantageously support more than one public key.

In an exemplary embodiment, the present systems and methods utilize an X.509 trust model, in which a trusted third party CA is responsible for signing digital certificates. Accordingly, as described herein, the CA is presumed to have capability to store one or more trusted root certificates (or intermediate certificates) as well as the corresponding private keys. The CA is further responsible for maintaining up-to-date revocation information regarding the validity of issued certificates, and will provide information to the other parties, for example, through an Online Certificate Status Protocol (OCSP). In some embodiments, the CA may provide information according to a Certificate Revocation List (CRL). The OCSP is an Internet protocol for obtaining a revocation status of an X.509 digital certificate, and is generally considered an alternative to the CRL. OCSP messages may be communicated, for example, by Abstract Syntax Notation One (ASN.1) encoding over the Hypertext Transfer Protocol (HTTP), from and to OCSP responders of the CA server (or OCSP server).

The specification for an X.509 Certificate allowing for a single public key may be expressed according to:

```
AlgorithmIdentifier ::= SEQUENCE {
    algorithm        OBJECT IDENTIFIER
    parameters       ANY DEFINED BY algorithm OPTIONAL}
SubjectPublicKeyInfo ::= SEQUENCE {
    algorithm        AlgorithmIdentifier
    subjectPublicKey BIT STRING }
```

In particular, the ("SubjectPublicKeyInfo") comprises an ("algorithmIdentifier") that identifies the cryptographic algorithm and associated parameters, and a ("subjectPublicKey") which is a BIT STRING, such as shown in RFC (Request for Comment) 5280. The value of the "subjectPublicKey") is the DER (distinguished encoding rules) encoding of the public key structure as defined for the specific algorithm used. For example, section 2.3.1 of RFC 3279 defines the contents of the ("subjectPublicKeyInfo") and how to encode the ("RSAPublicKey") structure whose DER representation is to be used for the value of the ("subjectPublicKey") BIT STRING. In some embodiments, the digital certificate may include an extension that allows it to encode an additional public key and additional signatures.

In an exemplary embodiment, multiple public keys and signatures are encoded into the digital certificate using composite keys and composite signatures. The present systems and methods thus provide innovative algorithm identifiers and associated encoding. In some embodiments, the new algorithm identifiers and encoding advantageously utilize standard sub-structures to simplify supporting sets of keys and their respective signatures. In such cases, the present embodiments further enable deployment of hybrid PKIs where the authentication may be performed by using 'traditional' or 'quantum resistant' cryptography.

In an embodiment, the systems and methods described herein further provide mixed authentication mechanisms that enable relying parties to rely on more than one algorithm for both signing and hashing to authenticate data (e.g., Certificates, CRLs, Generic Signed Data, etc.). In some embodiments, authentication is performed using the same cryptographic scheme with different hashing algorithms (e.g., one signature may be RSAwithSHA256, and another signature may be RSAwithSHA512). In other embodiments, authentication is performed using different cryptographic schemes with the same hashing algorithm (e.g., one signature may be with RSAwithSHA256, and another may be ECDSAwithSHA256). In at least one embodiment, these examples could are combined in whole or in part.

In some cases, the relying party may decide to verify one, some, or all of the signatures in order to trust the authentication of the data. According to the present systems and methods, the relying party may select based on the ability of the relying party to support the algorithms used for keys and signatures.

While the systems, methods, and examples provided herein are described with respect to X.509 keys and signatures, this description is by way of illustration, and not intended to be limiting. The person of ordinary skill in the art will understand, after reading and comprehending the present disclosure, how the present techniques are applicable with respect to other trust models where the encoding of multiple keys and/or multiple signatures is implemented. The systems and methods described herein are thus useful with any public key solution that makes use of public key technology, by providing techniques for distinguishing among algorithms for keys and signatures. The processes and systems described herein may be applied to non-X.509 infrastructures.

In an exemplary embodiment, a new value is added to the 'algorithm' field within the 'AlgorithmIdentifief' used in the 'SubjectPublicKeyInfo' of a digital certificate, such as an X.509 Certificate. In this example, the new value is a specific object identifier or (OID) to specify the user of a 'composite key' scheme where multiple public keys are used in a certificate. The 'parameters' field of the 'AlgorithmIdentifier' is set to NULL in this case. An example definition of an OID that may be sued with a multiple-key schema ('compositeKeys') is as follows:

```
compositeKeys OBJECT IDENTIFIER ::= {iso(1) identified-organization (3)
    dod (6) internet (1) private (4) enterprise (1) OpenCA (188227) 10 }
```

When the 'compositeKeys' value is used for the 'AlgorithmIdentifier,' the value encoded in the associated public key field (e.g., 'subjectPublicKey') may contain multiple public keys and their associated parameters. Specifically, the public key value is encoded as the DER representation of a 'CompositePublicKeyInfo.' The 'CompositePublicKeyInfo' is defined as a sequence of 'subjectPublicKeyInfo' where each 'subjectPublicKeyInfo' carries the information about one public key that is encoded in the certificate. An example definition of 'CompositePublicKeyInfo' is as follows:

CompositeSubjectPublicKeyInfo ::=SEQUENCE (1..MAX) OF SubjectPublicKeyInfo (1..MAX)

where the 'SubjectPublicKeyInfo' inside the 'CompositeSubjectPublicKeyInfo' may not use the 'compositeKey' as the algorithm identifier.

For example, having two different public keys in an X.509 certificate may be encoded as follows:

aCompositeSubjectPublicKeyInfo={keyInfoOne, keyInfoTwo};
    —This is the main structure with a sequence of two subjectPublicKeyInfo.
    keyInfoOne.algorithm.algorithm=rsaEncryption;
    keyInfoOne.algorithm.parameters=NULL;
    keyInfoOne.subjectPublickKey=RSAPublicKey;
    —keyInfoOne provides the information/definition of the first key (RSA)
    keyInfoTwo.algorithm.algorithm=id-ecPublicKey;
    keyInfoTwo.algorithm.parameters=EcpkParameters;
    keyInfoTwo.subjectPublickKey=ECPoint;
    —keyInfoTwo provides the information/definition of the second key (ECDSA)
    aCertificate.tbsCertificate.subjectPublicKeyInfo.algorithm.algorithm=compositeKey;
    aCertificate.tbsCertificate.subjectPublicKeyInfo.algorithm.parameters=NULL;
    aCertificate.tbsCertificate.subjectPublicKeyInfo.algorithm.subjectPublicKey=DER (aCompositeSubjectPublicKeyInfo);

where 'aCompositeSubjectPublicKeyInfo' is the sequence of two 'subjectPublicKeyInfo' (i.e., keyInfoOne and keyInfoTwo). The DER representation of the sequence is then stored in the subjectPublicKey field of subjectPublicKeyInfo in the certificate structure.

In the exemplary embodiment, a new value is added to the 'algorithm' field within the 'AlgorithmIdentifier' used in a digital certificate, such as an X.509 Certificate. In this example, the new value identifies a 'composite signature' schema where multiple signatures are used to authenticate the contents of a certificate. The 'parameters' field of the 'AlgorithmIdentifier' is set to NULL in this case. One example definition of an OID that may be sued with a multiple-key schema ('compositeSignatures') is as follows:

```
compositeSignatures OBJECT IDENTIFIER ::= {iso(1) identified-
    organization (3) dod (6) internet (1) private (4) enterprise (1) OpenCA
    (188227) 11 }
```

When the 'compositeSignatures' value is used for the algorithm identifier in the 'signatureAlgorithm' field of the certificate, the value encoded in the corresponding 'signatureValue' field may contain multiple signatures and their associated parameters. Specifically, in this example, the 'signatureValue' field is the DER representation of a 'CompositeSignatureValue' that is a sequence of 'SignatureInfo', where each 'SignatureInfo' carries the information about one of the signatures applied to the certificate. The definition of 'CompositeSignatureInfo' may thus be represented as follows:

CompositeSignatureValue ::=SEQUENCE (1..MAX) OF CompositeSignatureInfo

For example, to encode signatures made with two different keys (aka one RSA key and one EC key) the certificate may be encoded as follows:

aCompositeSignatureInfo={sigInfoOne, sigInfoTwo};
    —This is the main structure with a sequence of two SignatureInfo.
    sigInfoOne.algorithm.algorithm=rsaEncryption;
    sigInfoOne.algorithm.parameters=NULL;
    sigInfoOne.subjectPublickKey=<RSA Signature Value>;
    —sigInfoOne provides the definition of the first signature (RSA)
    sigInfoTwo.algorithm.algorithm=id-ecPublicKey;
    sigInfoTwo.algorithm.parameters=EcpkParameters;
    sigInfoTwo.subjectPublickKey=<ECDSA Signature Value>;
    —sigInfoTwo provides the definition of the second signature (ECDSA)
    aCertificate.signatureAlgorithm.algorithm.algorithm=compositeKey;
    aCertificate.signatureAlgorithm.algorithm.parameters=NULL;
    aCertificate.signatureValue=DER (aCompositeSignatureInfo);

where 'aCompositeSignatureInfo' is the sequence of two 'SignatureInfo' (i.e., sigInfoOne and sigInfoTwo). The aCompositeSignatureInfo may then be encoded by using DER and the output value used for the 'signatureValue' field of the certificate structure.

In an exemplary embodiment, to generate the composite signatures, the signer may generate each signature independently by using the set of keys in order. In the case where the public keys that are used to verify the signatures are encoded in a 'CompositeSubjectKeyInfo' structure, the signer may use the first key to generate the first signature, the second key may be used to generate the second signature, the third key may be used to generate the third signature, etc. The signer may then generate a signature for each key in the key set. For example, 'CompositeSubjectKeyInfo' may contain three keys, K1, K2, and K3, which may be of types RSA, RSA, and EC, respectively. In this example, the signing party generates the first signature using key K1, the second signature using key K2, and the third signature using key K3.

In an exemplary embodiment, to verify the composite signatures, the relying party may verify each of the applied signatures independently. In some embodiments, the relying party may decide to not evaluate all of the signatures, such as in the case where the relying party does not support the associated algorithm, or alternatively may refuse to trust the signed data entirely if the relying party is not able to verify one or more elements in the composite signatures.

In the case where the signer of a composite signature has an associated certificate, the relaying party may verify the signature by using the corresponding public key in the composite keys in order. In an exemplary embodiment, the order of the single signatures within the composite signature may match the order of the keys in the composite key certificate. For example, 'CompositeSubjectPublicKeyInfo' contains three keys, K1, K2, and K3, which may be of types RSA, RSA, and EC, respectively. In this example, the relaying party verifies the first signature in the composite signature using key K1, the second signature using key K2, and the last signature using key K3.

In some embodiments, the composite crypto structures may be used for trust structures to allow for backward compatibility or to allow for future upgrades to cryptographic capabilities. In these embodiments, the composite keys and composite signatures may include both weak and strong algorithms. Relying parties without updated cryptographic suites, such as devices that are already in the field, may then use the same infrastructure as those relying parties that are capable of using stronger algorithms to verify the signatures. These composite crypto structures would allow the support of older or already-in-the-field devices that have hardware constraints, such as a P-256 element that can only do P-256 encryption, without compromising the overall security of the infrastructure by also including stronger keys and algorithms used by more cryptographically capable devices. Further to this example, such structures may additionally support those devices that are able to upgrade, where such devices at first utilize weaker algorithms, but which may later utilize stronger algorithms when their respective cryptographic capabilities are upgraded.

The present embodiments offer several techniques for CRL and OCSP revocation. The CRL is a list of revoked certificates (by serial number) that have been issued and then subsequently revoked by a given CA. CRLs are generally published on a periodic interval or can be published only when a certificate is revoked by the CA. The composite crypto structures of the present embodiments though, advantageously support either technique.

In some embodiments, the CRLs may be signed with composite signatures as described above. In the case of X.509 certificates, the 'signatureAlgorithm' field in the 'CertificateList' structure may be set to 'compositeSignatures' and the 'parameters' field set to NULL. The 'signature' field of the 'CertificateList' may then be set to the DER representation of the 'CompositeSignaturesValue' that contains all of the signatures generated with the 'compositeKeys' in the signer's certificate.

In some embodiments, OCSP requests may include an optional 'Signature' field, which allows for authentication of the request. In this case, the composite crypto structure may be used to authenticate the OCSP request by using 'CompositeSignatures'. In particular, the 'signatureAlgorithm' algorithm identifier in the 'Signature' structure of the 'OCSPRequest' may be set to 'compositeSignatures' and the parameters field is set to NULL. The corresponding 'signature' field of the 'Signature' structure may be set to the DER representation of the 'CompositeSignaturesValue' that contains all of the signatures generated with the 'compositeKeys' in the signer's certificate. In this embodiment, the signatures may be calculated as described above.

In an embodiment, the OCSP response may also be authenticated with a digital signature. The 'BasicOCSPResponse' structure includes 'signatureAlgorithm' and 'signature' field that are compatible with composite signatures. For OCSP responses, the 'signatureAlgorithm' algorithm identifier in the 'BasicOCSPResponse' structure may be set to 'compositeSignatures' and the 'parameters' field set to NULL. The corresponding 'signature' field may then be set to the DER representation of the 'CompositeSignaturesValue' that contains all of the signatures generated with the 'compositeKeys' in the signer's certificate.

In another embodiment, the composite crypto structures may be used with certificate requests (CSRs). CSRs are usually in the form of a PKCS #10 message. The 'CertificateRequest' structure may include 'signatureAlgorithm' and 'signature' fields that may be used to authenticate the CSRs. In particular, the 'signatureAlgorithm' algorithm identifier in the 'CertificateRequest' structure may be set to 'compositeSignatures' and the 'parameters' field set to NULL. The corresponding 'signature' field may be set to the DER representation of the 'CompositeSignaturesValue' that contains all of the signatures generated with the 'compositeKeys' associated with the identity that is requesting a certificate.

In a further embodiment, the composite signatures may be used with the Cryptographic Message Syntax (CMS). In this example, the CMS format includes the 'signatureAlgorithm' and 'signature' fields of the 'SignerInfo' structure. In particular, the 'signatureAlgorithm' algorithm identifier in the 'SignerInfo' structure may be set to 'compositeSignatures' and the parameters field set to NULL. The corresponding 'signature' field may then be set to the DER representation of the 'CompositeSignaturesValue' that contains all of the signatures generated with the 'compositeKeys' associated with the signer (e.g., the 'CompositeSubjectKeyInfo' in the signer's certificate).

Many block chain technologies utilize PKIs to authenticate transactions. The present systems and methods further enable utilization of the binary field for these blockchain technologies to carry signature values, thereby further enabling composite signatures to protect signed data using multiple keys associated with a single identity.

In some embodiments, CRLs and OCSP responses may be used revoke individual algorithms used within the composite crypto structures. In these embodiments, the CRL lists the revoked algorithms, and the relying parties may then use other signatures in the composite signature that have been generated using non-revoked algorithms. For example, a relevant extension may be implemented as a SEQUENCE OF (1..MAX) OBJECT IDENTIFIER. Accordingly, each OID in the sequence identifies a specific algorithm which, if on the list of revoked algorithms, will not be used for any operation. By this technique, the present embodiments are able to more reliably ensure that certificates do not need to be reissued if they contain non-revoked signature algorithms. This system may also be implemented with one or more of the OCSP requests/responses described herein.

Through these advantageous systems and methods, revocation of a single key in a compositePublicKey is enabled. Accordingly, in the case where any of the basic keys within the compositePublicKey are revoked (e.g., compromised), the CRL may carry the revocation entry for that certificate and a non-critical extension in the entry that provides the hashing algorithm, as well as the list of key hashes (i.e., SEQUENCE OF OCTET STRING) that were compromised. In this example, relying parties who are not able/do not know how to process the extension, are nevertheless enabled to reject the certificate (since the relying party would not know which of the keys could still be trusted, in this example). Additionally, relying parties who do understand/are capable of understanding the extension may remove the identified keys from the validation process and, if the relying party cannot verify at least one of the remaining signatures, reject the entire signature.

In some embodiments, further mechanisms are provided to identify basic keys that compose the compositePublicKey in a certificate. For example, an extended subjectKeyIdentifier may be defined, where the identifiers for the basic SubjectPublicKeyInfo structures, which compose the CompositePublicKey (i.e., each of which relates to one of the basic keys) are listed. In this case, easier identification of the compromised basic keys across certificates may be obtained. In an embodiment, the extended subjectKeyIdentifier may be expressed as:

ExtendedSubjectKeyIdentifier ::=SEQUENCE OF (1..MAX) KeyIdentifier

—The KeyIdentifier is an OCTET STRING where the value of each KeyIdentifier is the KeyIdentifier for a basic key in the compositePublicKey.

FIG. 1 is a schematic illustration of a composite signature process 100 and data structures used therewith, according to an embodiment. In process 100, a signing party 102 generates a digital certificate 104 that is conveyed to a relying party 106. In some embodiments, signing party 102 and relying party 106 are in operable communication with one another. In other embodiments, relying party 106 is not in communication with signing party 102. In some embodiments, signing party 102 is a trusted CA, or other certificate issuer. In an exemplary embodiment, on or both of signing party 102 and relying party 106 are computing devices that include at least one processor in communication with at least one memory device (not separately illustrated).

In an exemplary embodiment, signing party 102 signs digital certificate 104 using Key K1 108, Key K2 110, and Key K3 112. In some embodiments, the three Keys 108, 110, 112 use the same cryptographic scheme with different hashing algorithms (e.g., one signature may be RSAwithSHA256, and another signature may be RSAwithSHA512). In other embodiments, the three Keys 108, 110, 112 use different cryptographic schemes with the same hashing algorithm (e.g., one signature RSAwithSHA256, another ECDSAwithSHA256). In still other embodiments, the three Keys 108, 110, 112 may use a combination of both techniques (e.g., K1 may use RSAwithSHA256, K2 may use RSAwithSHA512, and K3 may use ECD SAwithSHA256).

In an embodiment, signing party 102 uses the three keys 108, 110, 112 to generate a CompositeSignature 114 that includes Signature S1 116, Signature S2 118, and Signature S3 120. Signing party 102 generates the three Signatures S1 116, S2 118, S3 120 using the three keys K1 108, K2 110, K3 112, respectively. In this embodiment, signing party 116 first places first signature S1 116 in CompositeSignature 114, then places second signature S2 118 in a second position in CompositeSignature 114, and then third signature S3 120 in CompositeSignature 114 in a third position. In some embodiments signing party 102 further places information about the three keys K1 108, K2 110, K3 112 in digital certificate 104. In at least one embodiment, signing party 102 further includes PublicKeys K1 122, K2 124, K3 126 in digital certificate 104. In this example, PublicKeys K1 112, K2 124, K3 126 may be associated with keys K1 108, K2 110, and K3 112, respectively.

In an embodiment, relying party 106 may receive digital certificate 104 through a public communication portal, such as from a website on the Internet. Relying party 106 may then retrieve PublicKeys K1 112, K2 124, K3 126 from digital certificate 104, and then validate each of Signatures S1 116, S2 118, S3 120 with the provided PublicKeys K1 112, K2 124, K3 126, respectively. In some embodiments, relying party 106 checks a CRL or performs an OCSP request to confirm the validity of digital certificate 104. As a part of validating digital certificate 104, relying party 106 confirms the validity of the three PublicKeys K1 112, K2 124, K3 126, as well as their corresponding algorithms, prior to validating Signatures S1 116, S2 118, S3 120.

In some cases, relying party 106 may only be capable of performing the cryptographic validation of one or more, rather than all, of Signatures S1 116, S2 118, S3 120, such as in the case where relying party 106 has a limited cryptographic suite. As described above, the present systems and methods nevertheless enable significantly improved enhancement of PM utilization even where such limitations exist.

Figure 2:
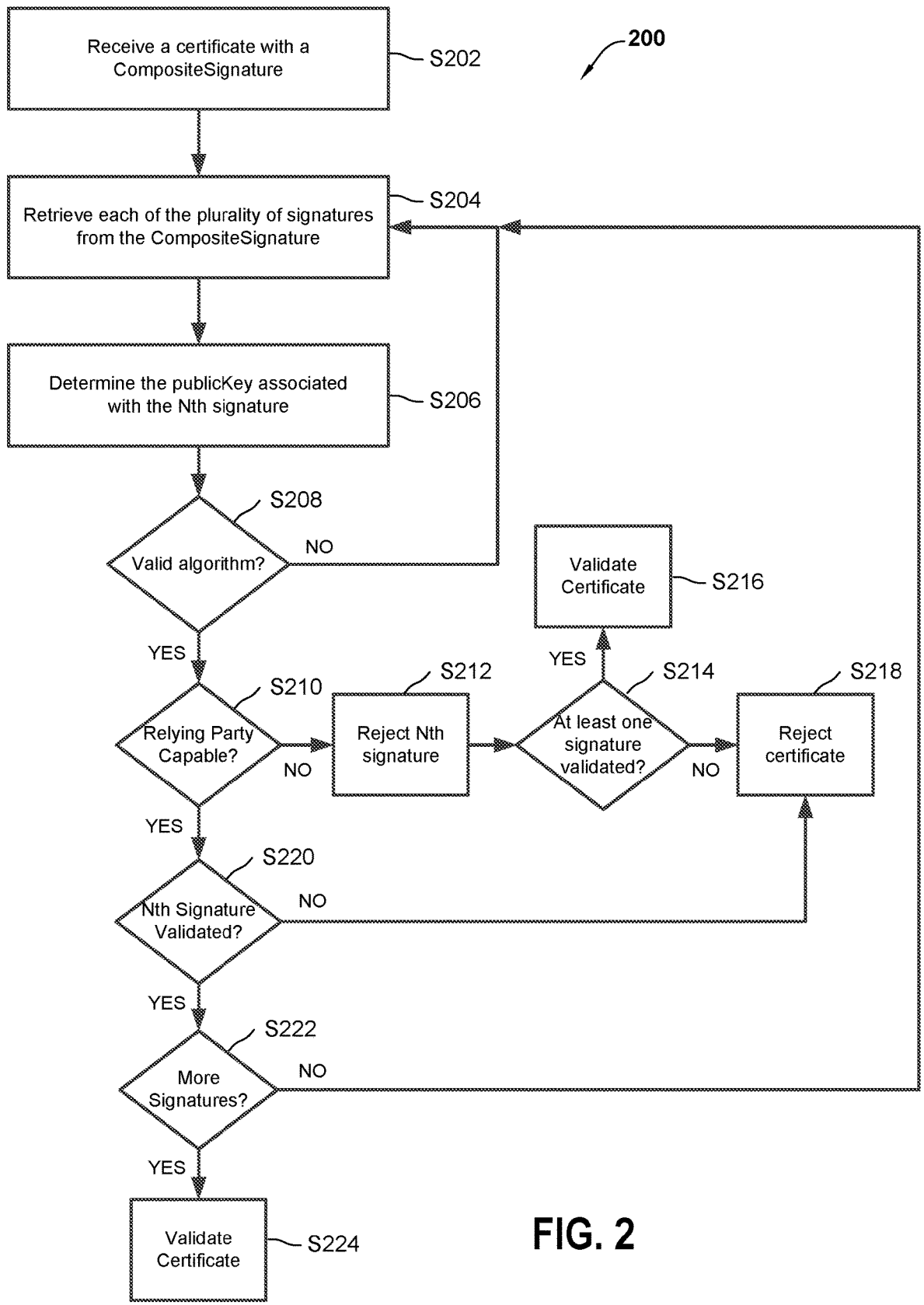
FIG. 2 is a schematic illustration of a composite signature validation process in accordance with the composite signature process and data structures depicted in FIG. 1.

FIG. 2 is a schematic illustration of a composite signature validation process 200 in accordance with composite signature process 100, FIG. 1, and associated data structures. In an exemplary embodiment, process 200 is executed by relying party 106, FIG. 1, using digital certificate 104.

In exemplary operation, process 200 begins at step S202, in which relying party 106 receives a digital certificate 104 with a CompositeSignature 114 (shown in FIG. 1). In step S204, relying party 106 retrieves each of Signatures S1 116, S2 118, S3 120 (shown in FIG. 1) from CompositeSignature 114. In step S206, for each of the Signatures S1 116, S2 118, S3 120, relying party 106 determines the PublicKey associated with the respective signature. In an exemplary embodiment of step S206, PublicKey K2 124 is associated with Signature S2 118. In at least one embodiment of step S206, relying party 106 proceeds with first Signature S1 116, and then continues through the signatures according to their respective order in CompositeSignature 114.

Step S208 is a decision step. In step S208, relying party 106 determines whether the algorithm associated with the current key and signature is still valid. In an exemplary embodiment of step S208, the determination is made according to whether the algorithm has been revoked, such as by comparing the algorithm to a CRL or OCSP response. If, in step S208, process 200 determines that the algorithm is not valid, process 200 returns to step S204, and relying party 106 moves on to the next key in CompositeSignature 114. If, however, process 200 determines in step S208 that the algorithm is valid, process 200 proceeds to step S210.

Step S210 is a decision step. In step S210, relying party 106 determines if it is capable of validating the signature using the validated algorithm. In an exemplary embodiment of step S210, process 200 determines if relying party 106 has the cryptographic capability to handle the validated algorithm. If, in step S210, process 200 determines that the relying party 106 is not capable of handling the validated algorithm, process 200 proceeds to step S212, in which relying party 106 rejects the current signature, and process 200 proceeds to step S214. Step S214 is also a decision step. In step S214, process 200 determines if relying party 106 has validated at least one of the signatures in CompositeSignature 114. If, in step S214, process 200 finds at least one such validated signature, process 200 proceeds to step S216 and validates digital certificate 104. If, however, process 200 in step S214 finds no validated signature, process 200 instead proceeds to step S218 and rejects digital certificate 104.

The preceding steps of process 200 are of particular value in the case where relying party 106 may only be able to process RSA encryption, and Signatures S1 116 and S2 118 may encrypted using RSA, but Signature S3 120 may be encrypted with EC. In this example, where relying party 106 is able to validate at least one of the RSA signatures (e.g., step S214), relying party 106 may still validate digital certificate 104 (e.g., step S216). In some embodiments, Steps S214, S216, and S218 may be performed after all of Signatures S1 116, S2 118, S3 120 have been subject to validation. That is, in an exemplary embodiment of process 200, step S212 may be repeated for all N of Signatures S1-$S_N$ before relying party 106 executes step S214.

Referring back to step S210, if process 200 determines that the relying party 106 is capable of handling the validated algorithm, process 200 proceeds to step S220. Step S220 is also a decision step. In step S220, process 200 determines if relying party 106 may validate the signature using the associated PublicKey. If, in step S220, relying party 106 does not validate at least one signature (of 1-N signatures), process 200 proceeds back to step S218 and rejects digital certificate 104. If, however, process 200 in step S220 finds at least validated signature, process 200 instead proceeds to step S222. Step S222 is also a decision step. In step S222, process 200 determines if there are more signatures to validate. If, in step S222, process 200 determines that more signatures are available for processing, process 200 returns to step S204, and executes the subsequent steps of process for the next signature. If, however, process 200 in step S222 finds no more signatures to process, process 200 instead proceeds to step S224 and validates digital certificate 104. In an embodiment of step S224, process 200 may validate digital certificate 104 if relying party 106 has validated all signatures of which it is capable validating, e.g., those signatures having algorithms that are supported but not revoked.

While the above description lists one or more specific cryptographic algorithms, the person of ordinary skill in the art will understand that other cryptographic algorithms may be used in accordance with the several embodiments described herein. For example, in the algorithIdentifier field 218, SHA-256 may be identified as being used. In other examples, the present systems and methods enable support for a number of other algorithms. The above systems and methods thus describe multiple different potential security considerations and solutions which improve the security of the digital certificates, while also providing for extended life and expanded use possibilities of the certificates. These security considerations are provided by way of example and not in a limiting sense.

The computer-implemented methods discussed herein may include additional, fewer, or alternative steps and/or executable actions, including those discussed elsewhere herein. The present methods may be further implemented using one or more local or remote processors, transceivers, and/or sensors (such as processors, transceivers, and/or sensors mounted on vehicles or mobile devices, or associated with smart infrastructure or remote servers), and/or through computer-executable instructions stored on non-transitory computer-readable media or medium.

Additionally, the computer systems discussed herein may include additional, fewer, or alternative functionalities as well, including without limitation those discussed elsewhere herein. The computer systems discussed herein may include, or be implemented using, computer-executable instructions stored on non-transitory computer-readable media or medium.

The exemplary embodiments provided herein describe a system for enhanced public key encryption infrastructure that allows for expanded encryption options, and which may be advantageously disposed within one or both of a computer device and a CA. The present systems and methods therefore serve to provide an improved verification system capable of: (i) allowing certificates to still be used after one or more of their cryptographic algorithms has been revoked; (ii) supporting multiple encryption methods simultaneously; (iii) supporting different devices having different cryptographic capabilities; (iv) providing support for quantum resistant cryptographic techniques; (v) allowing for backwards compatibility with existing systems; and (vi) limiting the required changes to existing digital certificate data structures to provide enhanced encryption options.

The aspects described herein may further be implemented as part of one or more computer components, such as a client device and/or one or more back-end components, and for either or both of a relying party and a signing party. Furthermore, the aspects described herein may also be implemented as part of computer network architecture and/or a cognitive computing architecture that facilitates communications between various other devices and/or components. Thus, the aspects described herein address and solve issues of a technical nature that are necessarily rooted in computer technology.

For instance, the present aspects include significantly improved capabilities for analyzing multiple signatures of digital certificates to ensure the security of those digital certificates, and to allow the certificates to be used by multiple devices with different cryptographic capabilities. Furthermore, these aspects advantageously reduce the chance of data compromise, while also extending the lifespan of digital certificates. Without the benefits realized according to the present systems and methods, accomplishment of the same goals would, at a minimum, require significantly additional processing and memory usage. Additional technical advantages according to the present embodiments include without limitation: (i) allowing certificates to still be used after one of their cryptographic algorithms have been revoked; (ii) supporting multiple encryption methods simultaneously; (iii) supporting different devices that have different cryptographic capabilities; (iv) providing support for quantum resistant cryptographic techniques; (v) allowing for backwards compatibility with existing systems; and (vi) limiting the required changes to existing digital certificate data structures to provide enhanced encryption options. Further technical advantages are described above.

The methods and systems described herein may be implemented using computer programming or engineering techniques including computer software, firmware, hardware, or any combination or subset thereof, and the technical effects thereto may be achieved by performing at least one of the following steps: (a) receiving a digital certificate including a composite signature field including a plurality of signatures, wherein the plurality of signatures include at least a first signature and a second signature; (b) retrieving, from the digital certificate, a first key associated with the first signature from the digital certificate; (c) retrieving the first signature from the composite signature field; (d) validating the first signature using the first key; (e) retrieving, from the digital certificate, a second key associated with the second signature; (f) retrieving the second signature from the composite signature field; (g) validating the second signature using the second key; (h) retrieving, from the digital certificate, a third key associated with the third signature of the plurality of signatures; (i) retrieving the third signature from the composite signature field; (j) validating the third signature using the third key; (k) determining a first cryptographic algorithm associated with the first key; (l) determining if the first cryptographic algorithm is valid; (m) determining if the first cryptographic algorithm is valid based on at least one of an Online Certificate Status Protocol (OCSP) and a Certificate Revocation List (CRL); (n) determining if the computer device is capable of processing the first algorithm; and (o) determining a second cryptographic algorithm associated with the second signature, wherein the first cryptographic algorithm and the second cryptographic algorithm are different.

The technical effects may also be achieved by performing at least one of the following steps: (a) generating a first signature using a first key and a first cryptographic algorithm; (b) generating a second signature using a second key and a second cryptographic algorithm; (c) combining the first signature and the second signature into a composite signature; (d) generating a digital certificate including the composite signature in a single field, wherein the composite signature includes a first signature, a second signature, and a third signature; (e) storing the first key in a first field of the plurality of fields and a first identifier for the first cryptographic algorithm in a second field of the plurality of fields; and (f) storing the second key in a third field of the plurality of fields and a second identifier for the second cryptographic algorithm in a fourth field of the plurality of fields, where the single field is a fifth field of the plurality of fields, and where the first cryptographic algorithm and the second cryptographic algorithm are different.

Furthermore, the embodiments described herein improve upon existing technologies, and improve the functionality of computers, by more accurately predicting and/or identifying the current status of digital certificates. The present embodiments thus improve the speed, efficiency, and accuracy in which such calculations and processor analysis may be performed. Due to these improvements, the present aspects address and solve computer-related issues relating improved efficiency over conventional techniques. The present aspects also address computer related issues that are related to computer security.

Accordingly, the innovative systems and methods described herein are of particular value within the realm of secure Internet communications. The present embodiments enable more reliable updating and monitoring of such communications, and without compromising data and speed. Furthermore, according to the disclosed techniques, user computer devices are better able to monitor and determine the security of websites and other connected devices, thereby protecting the computer devices from malicious actors.

Exemplary embodiments of systems and methods for determining revocation statuses of digital certificates are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for enhanced public key infrastructure comprising a computer device comprising at least one processor in communication with at least one memory device, and wherein the at least one memory device stores a plurality of instructions, wherein the at least one processor is programmed to:

receive a digital certificate including a composite signature field including a plurality of signatures, wherein the plurality of signatures include at least a first signature and a second signature, and wherein the first signature and the second signature are provided by a first certificate authority, wherein the first certificate authority generates the first signature using a first cryptographic algorithm and the second signature using a second cryptographic algorithm, wherein the first cryptographic algorithm is associated with a first key and wherein the second cryptographic algorithm is associated with a second key, and wherein the first cryptographic algorithm is different from the second cryptographic algorithm;

retrieve, from the digital certificate, the first key associated with the first signature from the digital certificate;

retrieve the first signature from the composite signature field;

validate the first signature using the first key;

retrieve, from the digital certificate, the second key associated with the second signature;

retrieve the second signature from the composite signature field; and validate the second signature using the second key.

2. The system in accordance with claim 1, wherein the at least one processor is further programmed to:

retrieve, from the digital certificate, a third key associated with a third signature of the plurality of signatures, wherein the third key and the third signature are associated with the first certificate authority;

retrieve the third signature from the composite signature field; and validate the third signature using the third key.

3. The system in accordance with claim 1, wherein the at least one processor is further programmed to determine the first cryptographic algorithm associated with the first key.

4. The system in accordance with claim 3, wherein the at least one processor is further programmed to determine if the first cryptographic algorithm is valid.

5. The system in accordance with claim 4, wherein the at least one processor is further programmed to determine if the first cryptographic algorithm is valid based on at least one of an Online Certificate Status Protocol (OCSP) and a Certificate Revocation List (CRL).

6. The system in accordance with claim 3, wherein the at least one processor is further programmed to determine if the computer device is capable of processing the first cryptographic algorithm associated with the first signature.

7. The system in accordance with claim 3, wherein the at least one processor is further programmed to determine the second cryptographic algorithm associated with the second signature.

8. A computing device for enhanced public key infrastructure comprising at least one processor in communication with at least one memory device, and wherein the at least one memory device stores a plurality of instructions, wherein the at least one processor is programmed to:

generate a first signature associated with a first key and a first cryptographic algorithm;

generate a second signature associated with a second key and a second cryptographic algorithm, wherein the first signature and the second signature are provided by a first certificate authority, wherein the first certificate authority generates the first signature using a first cryptographic algorithm and the second signature using a second cryptographic algorithm, wherein the first cryptographic algorithm is associated with the first key and wherein the second cryptographic algorithm is associated with the second key, and wherein the first cryptographic algorithm is different from the second cryptographic algorithm;

combine the first signature and the second signature into a composite signature; and generate a digital certificate including the composite signature in a single field.

9. The computing device in accordance with claim 8, wherein the digital certificate includes a plurality of fields, and wherein the at least one processor is further programmed to:

store the first key in a first field of the plurality of fields and a first identifier for the first cryptographic algorithm in a second field of the plurality of fields; and store the second key in a third field of the plurality of fields and a second identifier for the second cryptographic algorithm in a fourth field of the plurality of fields.

10. The computing device in accordance with claim 9, wherein the single field is a fifth field of the plurality of fields.

11. The computing device in accordance with claim 8, wherein the composite signature includes the first signature, the second signature, and a third signature.

12. The system in accordance with claim 1, wherein the at least one processor is further programmed to validate the digital certificate if the first signature and the second signature are valid.

13. The system in accordance with claim 1, wherein the at least one processor is further programmed to validate the digital certificate if the first signature is invalid and the second signature are valid.

14. The system in accordance with claim 2, wherein the at least one processor is further programmed to validate the digital certificate if the first signature and the second signature are invalid and the third signature is valid.

* * * * *